Dec. 25, 1951     W. J. STUBER ET AL     2,580,253
VENETIAN BLIND TILT MECHANISM WITH
CORD REPOSITIONING FEATURE
Filed Jan. 2, 1951
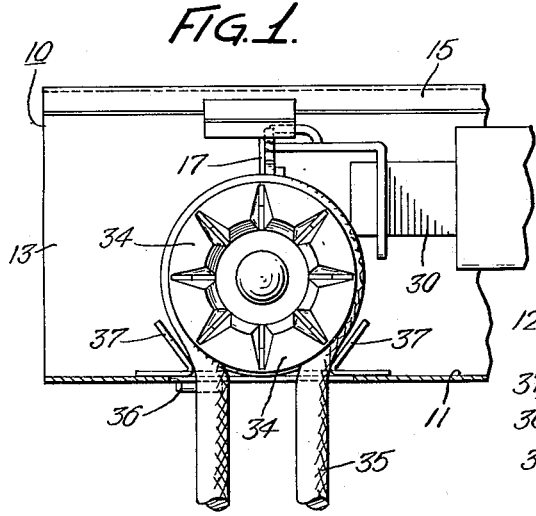
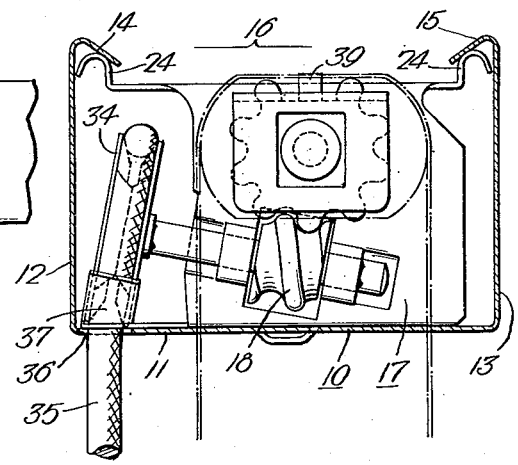
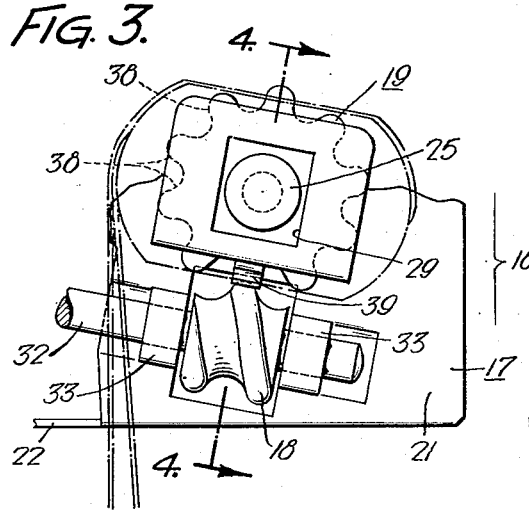
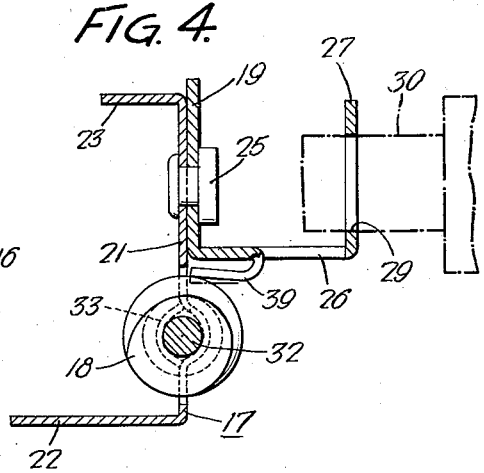
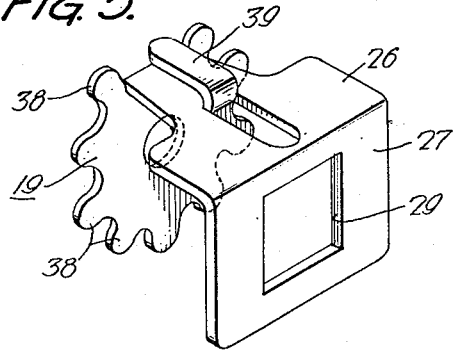

Patented Dec. 25, 1951

2,580,253

UNITED STATES PATENT OFFICE 2,580,253

VENETIAN BLIND TILT MECHANISM WITH CORD REPOSITIONING FEATURE

Walter J. Stuber and John J. Di Ienno, Philadelphia, Pa., assignors to Carey-McFall Company, Philadelphia, Pa., a corporation of Pennsylvania Application January 2, 1951, Serial No. 203,846

4 Claims. (Cl. 160—176)

The present invention relates to new and useful improvements in tilt mechanism for Venetian blinds, and more particularly to new and useful improvements in tilt mechanisms wherein means are provided to allow the tilt cord to be easily repositioned or relocated on the rope sheave.

The tilt mechanism of a Venetian blind generally comprises a worm wheel and a gear associated with the tilt shaft and driven by the worm wheel which in turn is rotated by means of a cord operated pulley. Usually the cord passes over the pulley and has its two ends hanging free so that they may be grasped by the operator. When the Venetian blind is in use, the tilt cord inadvertently slips in one direction or the other over the pulley until, after repeated manipulations of the blind, the tilt cord is not centrally located on the pulley. Accordingly, it becomes necessary periodicaly to relocate the tilt cord upon the pulley. This may be done either by manually threading the tilt cord about the pulley, a difficult and tedious operation, or by disengaging the gear from the worm wheel so that the latter may be rotated freely relative to the gear segment, for example, by eliminating entirely a portion of the teeth on the gear segment so that in at least one position the gear and worm are out of mesh, a construction which may jam when the gear is returned into engagement with the worm.

With the foregoing in mind, the principal object of the present invention is to provide a tilt mechanism for Venetian blinds embodying a novel construction and arrangement of the gear and worm to permit rotation of the latter with respect to the gear without complete disengagement of the worm and gear.

Another object of the present invention is to provide a novel Venetian blind tilt mechanism of the stated character which is constructed to permit the tilt cord to be easily positioned centrally with respect to the pulley without disengaging the worm and the gear.

A still further object of the present invention is to provide a novel Venetian blind tilt mechanism having the features and characteristics set forth which may be manufactured easily and cheaply and which is efficient and effective in operation and use.

These and other objects of the present invention and the various features and details of the operation and construction thereof are hereinafter more fully set forth and described with reference to the acompanying drawing, in which:

Fig. 1 is a fragmentary side elevational view of the tilt mechanism for a Venetian blind;

Fig. 2 is an end elevational view of the tilt mechanism of the present invention installed in the head casing of a Venetian blind;

Fig. 3 is an enlarged fragmentary elevational view of the tilt mechanism of the present invention in a removed relationship from the Venetian blind.

Fig. 4 is a sectional view taken on line 4—4, Fig. 3; and

Fig. 5 is a perspective view of the worm wheel segment of the tilt mechanism made in accordance with the present invention.

Referring more particularly to the drawing, reference numeral 10 designates generally the head casing for a Venetian blind. The casing 10 comprises a base portion 11 and relatively vertical side wall portions 12 and 13 which terminate at their upper ends in longitudinal channels 14 and 15, respectively. These channels 14 and 15 aside from stiffening the head casing 10 also serve to secure the various component parts of the Venetian blind to the head casing.

In accordance with the present invention, the tilt mechanism designated generally as 16 comprises a cross-frame member 17. In the illustrated embodiment of the invention, the cross-frame member 17 is formed of a plate 21 having a foot flange 22 resting on and secured to the bottom panel 11 of the head casing 10. The plate 21 is also provided with an upper flange 23 which extends horizontally from the upper end thereof and terminates in vertical projections or ears 24. These ears 24 extend into the longitudinal casing channels 14 and 15, respectively, at the upper edges of the front panel 12 and rear panel 13, and impart rigidity to the casing.

The plate 21 has secured therein a rivet or stud 25 on which is rotatably mounted the gear portion 19 of a member 20. Forming a part of the member 20 and extending outwardly therefrom is a lateral extension 26 which terminates in an arm 27 that is disposed in a plane parallel to the plane of the gear 19 and spaced axially therefrom. A rectangular opening 29 is provided centrally in the arm 27 and is adapted to receive the correspondingly shaped tilt shaft 30 of the Venetian blind.

A worm wheel 18 is secured upon a shaft 32 which is rotatably mounted in the plate 21 as indicated at 33 directly beneath the gear 19, and fixedly secured to the outwardly extending end of the shaft 32 is a notched or serrated pulley 34 about which passes the customary tilt cord or rope 35. The cord 35 is directed downwardly through an opening 36 in the bottom panel 11 of the head casing 10 by means of guides 37 formed as an integral part of the lower plate flange 22.

The gear portion 19 is provided with a plurality of teeth 38 which are adapted to engage the worm 18 so that rotation of the latter, by pulling the tilt cord 35 in one direction or the other, operates to rotate the gear portion 19 and thereby effect a corresponding rotation of the tilt shaft 30 to vary the angle or tilt of the slats of the blind as desired.

In accordance with the present invention and with reference particularly to Fig. 5 of the drawing, the teeth 38 are arranged in equally spaced relation continuously about the circumference of the gear portion 19 from one side of the lateral extension 26 to the other side thereof. However, in order to provide for continued intermeshing of the worm and gear at the junction between the latter and the extension 26 so as to provide, in effect, a continuous series of teeth entirely circumferentially of the gear portion 19 for engagement with the worm 18, there is stamped from the extension 26 a lug portion 39. This lug 39 is reversely bent with respect to the extension 26 so as to overlie the latter and extend in the direction of the gear 19, and the free end of the lug 39 is disposed intermediate the terminal teeth 38 at the opposite sides of the extension 26 in position to mesh with the worm and perform the function of a tooth on the gear 19. The free end portion of the lug 39 is resiliently yieldable so that it may be displaced to a limited extent by the application of force of a certain magnitude.

By reason of this construction, when it is desirable to relocate the tilt cord 35 with respect to the pulley 34, it is only necessary to tilt the Venetian blind to the appropriate limit tilt position and then continue to exert a substantial pull on the short end of the tilt cord. Since the tilt rod and slats of the blind are in a limit tilt position they cannot be rotated further and continued pressure of the worm 18 against the lug 39 causes the latter to be yieldably displaced radially inward with respect to the gear 19 in the manner illustrated in Fig. 4 of the drawings, thereby permitting the worm to be forced over the lug 39. By forcing the worm over the lug 39 the worm may be rotated relative to the gear 19 until the tilt cord 35 is properly relocated on the pulley 34.

From the foregoing, it will be observed that the present invention provides a novel Venetian blind tilt mechanism embodying a novel construction and arrangement of gear and worm to permit rotation of the latter with respect to the gear without the disadvantages of complete disengagement of the worm and gear. Furthermore, the present invention provides a novel Venetian blind tilt mechanism which is constructed to permit the tilt cord to be easily positioned centrally with respect to the pulley without disengaging the worm and gear.

While a certain embodiment of the present invention has been illustrated and described herein, it is not intended to limit the invention to such disclosure and changes and modifications may be incorporated and embodied therein within the scope of the following claims:

We claim:

1. In tilt mechanism for a Venetian blind having the usual tilt shaft for angularly positioning the slats of the blind, a rotatably mounted worm, a tilt cord connected to said worm for rotationally actuating the latter, a gear normally meshed with said worm and having driving connection with said tilt shaft, said gear having teeth and extending circumferentially thereof continuously except for a portion of said circumference disposed in confronting relation to the worm in the limit tilt positions only, and a member disposed between the gear teeth in confronting relation to the portion of the gear devoid of teeth and arranged in the limit tilt positions only of the blind normally to mesh with the worm and function as a tooth of the gear, said member being displaceable in a direction inwardly of the gear so that in said limit tilt positions of the blind continued pull exerted on the tilt cord operates to cause the worm to displace said member and effect rotation of said worm with respect to the gear to reposition the tilt cord.

2. In tilt mechanism for a Venetian blind having the usual tilt shaft for angularly positioning the slats of the blind, a rotatably mounted worm, a tilt cord connected to said worm for rotationally actuating the latter, a member including a gear portion normally meshed with said worm and having a lateral extension from a peripheral part of the gear terminating in a portion having driving connection with said tilt shaft, said member gear portion having teeth extending circumferentially thereof from one side of the said lateral extension to the other side thereof, and an element disposed between the gear teeth at opposite sides of the extension and arranged in the limit tilt positions only of the blind normally to mesh with the worm and function as a tooth of the gear, said element being resiliently displaceable inwardly with respect to the gear so that in said limit tilt positions of the blind continued pull exerted on the tilt cord operates to cause said worm to yieldingly displace the element and effect rotation of the worm with respect to the gear to reposition the tilt cord.

3. In tilt mechanism for a Venetian blind having the usual tilt shaft for angularly positioning the slats of the blind, a rotatably mounted worm, a tilt cord connected to said worm for rotationally actuating the latter, a member including a gear portion normally meshed with said worm and having a lateral extension from a peripheral part of the gear terminating in a portion having driving connection with said tilt shaft, said member gear portion having teeth extending circumferentially thereof from one side of the said lateral extension to the other side thereof, and an element on said lateral extension disposed between the gear teeth at opposite sides of the extension and arranged in the limit tilt positions only of the blind normally to mesh with the worm and function as a tooth of the gear, said element being resiliently displaceable inwardly with respect to the gear so that in said limit tilt positions of the blind continued pull exerted on the tilt cord operates to cause said worm to yieldingly displace the element and effect rotation of the worm with respect to the gear to reposition the tilt cord.

4. In tilt mechanism for a Venetian blind having the usual tilt shaft for angularly positioning the slats of the blind, a rotatably mounted worm, a tilt cord connected to said worm for rotationally actuating the latter, a member including a gear portion normally meshed with said worm and having a lateral extension from a peripheral part of the gear terminating in a portion having driving connection with said tilt shaft, said member portion having teeth extending circumferentially thereof from one side of the said lateral extension to the other side thereof, and a lug pressed from said lateral extension disposed between the gear teeth at opposite sides of the extension and arranged in the limit tilt positions only of the blind normally to mesh with the worm and function as a tooth of the gear, said element being resiliently displaceable inwardly with respect to the gear so that in said limit tilt positions of the blind continued pull exerted on the tilt cord operates to cause said worm to yieldingly displace the element and effect rotation of the worm with respect to the gear to reposition the tilt cord.

WALTER J. STUBER.
JOHN J. DI IENNO.

No references cited.